United States Patent
Lee et al.

(10) Patent No.: US 11,184,593 B2
(45) Date of Patent: Nov. 23, 2021

(54) IMAGE CAPTURING DEVICE AND METHOD

(71) Applicants: Yumin Lee, Taipei (TW); Min-Chen Ho, Taipei (TW); Sheng-Chung Lai, Taipei (TW)

(72) Inventors: Yumin Lee, Taipei (TW); Min-Chen Ho, Taipei (TW); Sheng-Chung Lai, Taipei (TW)

(73) Assignee: ITE Tech. Inc., Hsinchu (TW)

( * ) Notice: Subject to any disclaimer, the term of this patent is extended or adjusted under 35 U.S.C. 154(b) by 86 days.

(21) Appl. No.: 16/853,770

(22) Filed: Apr. 21, 2020

(65) Prior Publication Data

US 2021/0168344 A1 Jun. 3, 2021

(30) Foreign Application Priority Data

Nov. 29, 2019 (TW) .................... 108143646

(51) Int. Cl.
*H04N 9/64* (2006.01)
*H04N 9/69* (2006.01)
*H04N 5/235* (2006.01)

(52) U.S. Cl.
CPC .......... *H04N 9/646* (2013.01); *H04N 5/2355* (2013.01); *H04N 9/69* (2013.01)

(58) Field of Classification Search
CPC .................................................. H04N 9/646
USPC ....................................................... 348/222.1
See application file for complete search history.

(56) References Cited

U.S. PATENT DOCUMENTS 7,733,525 B2 * 6/2010 Cho .................... H04N 1/6058
358/1.9
10,397,486 B2 8/2019 Kitajima

OTHER PUBLICATIONS

Erik Reinhard et al., "Photographic Tone Reproduction for Digital Images", ACM Transactions on Graphics, vol. 21, Issue 3, May 2002, pp. 1-10.
R. Mantiuk et al., "Color Correction for Tone Mapping", Computer Graphics Forum, vol. 28, Issue 2, Apr. 2009, pp. 193-202.
Sony, "HDR (High Dynamic Range)", retrieved on Apr. 2020, Available at: https://assets.pro.sony.eu/Web/ngp/pdf/HDR-explained-v3.pdf.

(Continued)

*Primary Examiner* — Joel W Fosselman
(74) *Attorney, Agent, or Firm* — JCIPRNET (57) ABSTRACT

The disclosure provides an image capturing device and an image capturing method. The image capturing device includes a tone mapping circuit, a color correction circuit, and a color gamut mapping circuit. The tone mapping circuit obtains a first image including a first pixel and performs a tone mapping operation to obtain a brightness adjustment parameter, where the first pixel includes a plurality of first color channels. The color correction circuit converts the first color channels into a plurality of second color channels based on the brightness adjustment parameter and the brightness of the first pixel. The color gamut mapping circuit performs a color gamut mapping operation on the second color channels to convert the second color channels into a plurality of third color channels, and outputs a second image, where the second image includes the second pixel characterized by the third color channels.

13 Claims, 4 Drawing Sheets

(56) References Cited

OTHER PUBLICATIONS

International Telecommunication Union, "Parameter values for ultra-high definition television systems for production and international programme exchange", Recommendation BT.2020-2, Oct. 2015, pp. 1-8.
International Telecommunication Union, "Parameter values for the HDTV standards for production and international programme exchange", Recommendation ITU-R BT.709-6, Jun. 2015, pp. 1-19.
International Telecommunication Union, "Colour gamut conversion from Recommendation ITU-R BT.2020 to Recommendation ITU-R BT.709", Report ITU-R BT.2407-0, Oct. 2017, pp. 1-47.
Ji Won Lee et al., "Combined luminance compression and color constraint for color correction in tone mapping", The 2011 IEEE 54th International Midwest Symposium on Circuits and Systems (MWSCAS), Aug. 7-10, 2011, pp. 1-4.
"Office Action of Taiwan Counterpart Application", dated Jun. 23, 2021, p. 1-p. 8.

* cited by examiner

IMAGE CAPTURING DEVICE AND METHOD

CROSS-REFERENCE TO RELATED APPLICATION

This application claims the priority benefit of Taiwan application serial no. 108143646, filed on Nov. 29, 2019. The entirety of the above-mentioned patent application is hereby incorporated by reference herein and made a part of this specification.

BACKGROUND

Technical Field

The disclosure relates to an image processing technique, and particularly relates to an image capturing device and an image capturing method.

Description of Related Art

In the field of image processing, how to provide "high definition image" with better performance has always been a topic of great concern to those skilled in the art. Generally, the following aspects contribute to the realization of "high definition image": (1) resolution: from full High Definition (HD) to Ultra HD, i.e. 4K, even 8K; (2) frame rate: to progress from 24 or 30 frames per second to 60 or more frames per second; (3) bit depth: to progress from 8-bit per color channel to 10-bit or even 12-bit per color channel; (4) High Dynamic Range (HDR): from a Standard Dynamic Range (SDR) to the HDR; (5) Wide Color Gamut (WCG): from a Standard Color Gamut (SCG) to the WCG.

Since a total amount of data of the high definition image is very high, a large amount of calculations is required for any of encoding, decoding and display. Moreover, it also requires a display device that complies with the HDR/WCG standard to display the correct colors (including brightness and chroma), so that in many applications there is a need to "reduce image quality", so as to reduce the amount of data or subsequent calculations.

In some applications, if the input of the image processing device is a high definition image but the output must be a standard definition image, the conventional method is to directly discard some bits to reduce the number of bits without performing any conversion. However, such method may cause incorrect color display, and gray and low chroma in display.

Moreover, there is also a practice of directly outputting the high definition image to a computer device, and then the computer device processes the high definition image by using specific software before presenting it to the user. However, in addition to requiring additional hardware and software, such method will also consume a computing power of the computer device. Moreover, such method cannot provide real-time images, so it is not suitable for scenarios that require more real-time application such as live broadcast, video conference, etc.

SUMMARY

The invention is directed to an image capturing device and method, which are adapted to resolve the above technical problem.

The invention provides an image capturing device including a tone mapping circuit, a color correction circuit, and a color gamut mapping circuit. The tone mapping circuit obtains a first image including a first pixel and performs a tone mapping operation to obtain a brightness adjustment parameter based on a brightness of the first pixel, where the first pixel includes a plurality of first color channels. The color correction circuit is coupled to the tone mapping circuit, and converts the first color channels into a plurality of second color channels based on the brightness adjustment parameter and the brightness of the first pixel, where a color gamut corresponding to the second color channels is narrower than a color gamut corresponding to the first color channels. The color gamut mapping circuit is coupled to the color correction circuit, and performs a color gamut mapping operation on the second color channels to convert the second color channels into a plurality of third color channels, and outputs a second image, where the second image includes a second pixel characterized by the third color channels.

The invention provides an image capturing device including a first conversion circuit, a tone mapping circuit, a color correction circuit, a color gamut mapping circuit and a second conversion circuit. The first conversion circuit obtains a first image including a first pixel, and converts a plurality of first color channels of the first pixel into a plurality of reference color channels, where the first color channels correspond to a first color space, and the reference color channels correspond to a second color space. The tone mapping circuit is coupled to the first conversion circuit, and performs a tone mapping operation to obtain a brightness adjustment parameter based on a brightness of the first pixel. The color correction circuit is coupled to the tone mapping circuit, and converts the reference color channels into a plurality of second color channels based on the brightness adjustment parameter and the brightness of the first pixel, where a color gamut corresponding to the second color channels is narrower than a color gamut corresponding to the reference color channels. The color gamut mapping circuit is coupled to the color correction circuit, and performs a color gamut mapping operation on the second color channels to convert the second color channels into a plurality of third color channels. The second conversion circuit is coupled to the color gamut mapping circuit, and converts the third color channels into a plurality of fourth color channels corresponding to the first color space, and outputs a second image, where the second image includes a second pixel characterized by the fourth color channels.

The invention provides an image capturing device including a first conversion circuit, a gamma correction circuit, a tone mapping circuit, a color correction circuit, a color gamut mapping circuit, an inverse gamma correction circuit and a second conversion circuit. The first conversion circuit obtains a first image including a first pixel, and converts a plurality of first color channels of the first pixel into a plurality of reference color channels, where the first color channels correspond to a first color space, and the reference color channels correspond to a second color space. The gamma correction circuit is coupled to the first conversion circuit, and executes a gamma correction on the reference color channels. The tone mapping circuit is coupled to the gamma correction circuit, and performs a tone mapping operation to obtain a brightness adjustment parameter based on a brightness of the first pixel. The color correction circuit is coupled to the tone mapping circuit, and converts the corrected reference color channels into a plurality of second color channels based on the brightness adjustment parameter and the brightness of the first pixel, where a color gamut corresponding to the second color channels is narrower than a color gamut corresponding to the reference color channels. The color gamut mapping circuit is coupled to the color correction circuit, and performs a color gamut mapping operation on the second color channels to convert the second color channels into a plurality of third color channels. The inverse gamma correction circuit is coupled to the color gamut mapping circuit, and executes an inverse gamma correction on the third color channels. The second conversion circuit is coupled to the inverse gamma correction circuit, and converts the inverse-corrected third color channels into a plurality of fourth color channels corresponding to the first color space, and outputs a second image, where the second image includes a second pixel characterized by the fourth color channels.

The invention provides an image capturing method including: obtaining a first image including a first pixel, and performing a tone mapping operation to obtain a brightness adjustment parameter based on a brightness of the first pixel, where the first pixel includes a plurality of first color channels; converting the first color channels into a plurality of second color channels based on the brightness adjustment parameter and the brightness of the first pixel, where a color gamut corresponding to the second color channels is narrower than a color gamut corresponding to the first color channels; performing a color gamut mapping operation on the second color channels to convert the second color channels into a plurality of third color channels, and outputting a second image, where the second image includes a second pixel characterized by the third color channels.

Based on the above description, after obtaining the first image from an image source device, the image capturing device of the invention sequentially performs the tone mapping operation, brightness adjustment operation and color gamut mapping operation, etc., on the pixel therein through the corresponding hardware circuit, so as to convert the first image into the second image with lower distortion. In this way, the invention may provide the second image with lower distortion in real-time without consuming the resources of a destination device (such as a computer device), which is suitable for occasions that require more real-time performance.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
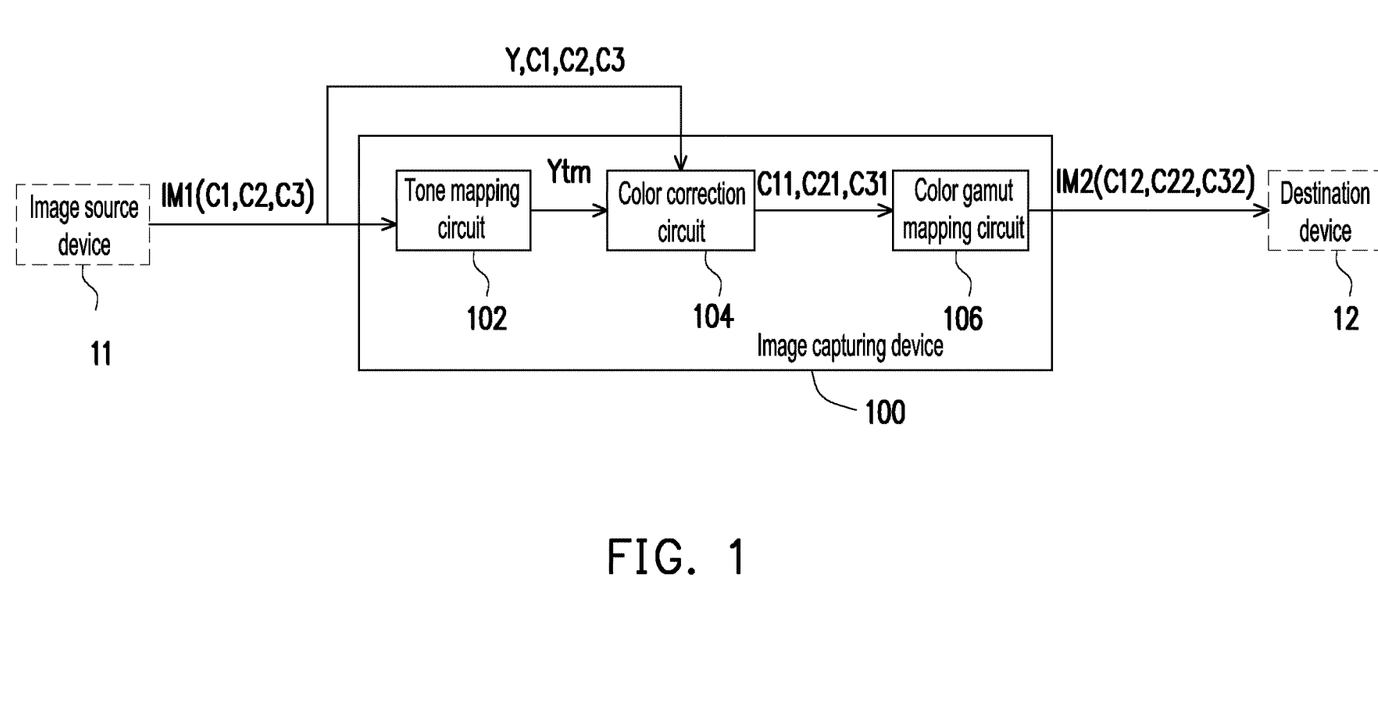
FIG. 1 is a schematic diagram of an image capturing device according to an embodiment of the invention.

Referring to FIG. 1, FIG. 1 is a schematic diagram of an image capturing device according to an embodiment of the invention. In the embodiment, the image capturing device 100 receives a first image IM1 (which is, for example, a high definition image) from an image source device 11, and converts the first image IM1 into a second image IM2 with lower quality (for example, a standard definition image), and outputs the second image IM2 to a destination device 12. In different embodiments, the source device 11 is, for example, an electronic device capable of providing the high definition image, such as a video game console, a high-definition camera, etc., but the invention is not limited thereto. Moreover, the destination device 12 may be an electronic device used for displaying/processing the standard definition image, which is, for example, a general computer device or an image providing device with a specific purpose (such as a video conference system), but the invention is not limited thereto.

In the embodiment of the invention, the so-called high definition image is, for example, an image having a bit number of not less than 10 bits and supporting HDR and WCG (for example, complied with ITU-R BT.2020 standard). Moreover, the so-called standard definition image is, for example, an image with a bit number of 8 bits and supporting SDR and SCG (for example, complied with ITU-R BT.709 standard), but the invention is not limited thereto.

As shown in FIG. 1, the image capturing device 100 may include a tone mapping circuit 102, a color correction circuit 104, and a color gamut mapping circuit 106, where the color correction circuit 104 may be coupled between the tone mapping circuit 102 and the color gamut mapping circuit 106. In the embodiment of the invention, the image capturing device 100 may be used for executing an image capturing method provided by the invention to produce the standard definition image (i.e. the second image IM2, which is described later) with color performance close to that of the high definition image in better efficiency.

Figure 2:
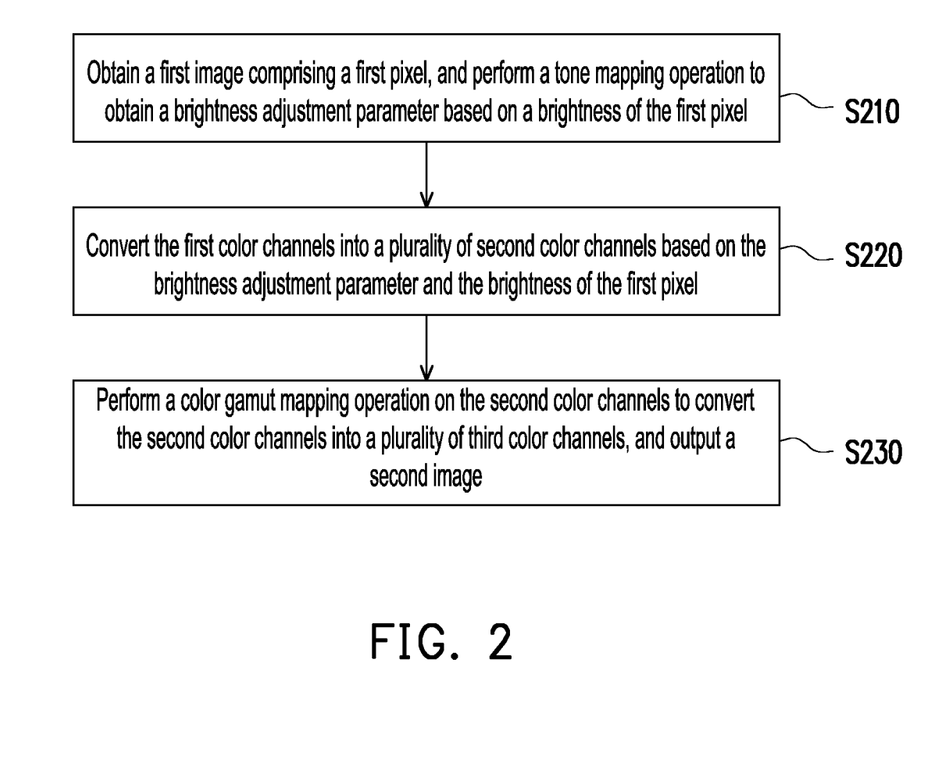
FIG. 2 is a flowchart illustrating an image capturing method according to an embodiment of the invention.

Referring to FIG. 2, FIG. 2 is a flowchart illustrating an image capturing method according to an embodiment of the invention. The image capturing method of the embodiment may be executed by the image capturing device 100 of FIG. 1, and details of the steps of FIG. 2 are described below with reference of various components shown in FIG. 1.

First, in a step S210, the tone mapping circuit 102 obtains the first image IM1 (for example, a high definition image) including a first pixel, and performs a tone mapping operation to obtain a brightness adjustment parameter Ytm based on a brightness Y of the first pixel, where the first pixel includes a plurality of first color channels C1, C2, C3. In an embodiment, the first image IM1 may be transmitted from the image source device 11 to the image capturing device 100 through a first image transmission interface. In different embodiments, the first image transmission interface is, for example, one of a High Definition Multimedia Interface (HDMI), a Mobile Industry Processor Interface (MIPI) and a Low Voltage Differential Signaling (LVDS) transmission interface, but the invention is not limited thereto.

For simplicity's sake, it is assumed that the first color channels C1, C2 and C3 respectively correspond to R, G, B channels of the first pixel, but the invention is not limited thereto. In an embodiment, details of the aforementioned tone mapping operation may refer to content of [2 Erik Reinhard, Michael Stark, Peter Shirley, and James Ferwerda, "Photographic Tone Reproduction For Digital Images" ACM Transactions on Graphics 21(3), May 2002], which are not repeated. Moreover, in order to implement the technical content of the above literature, the tone mapping circuit 102 may include various hardware components required for implementing the above technique.

Then, in a step S220, the color correction circuit 104 converts the first color channels C1, C2 and C3 into a plurality of second color channels C11, C21 and C31 based on the brightness adjustment parameter Ytm and the brightness Y of the first pixel, where a color gamut corresponding to the second color channels C11, C21 and C31 is narrower than a color gamut corresponding to the first color channels C1, C2 and C3. In an embodiment, the color gamut corresponding to the second color channels C11, C21 and C31 is, for example, SCG, and the color gamut corresponding to the first color channels C1, C2 and C3 is, for example, WCG, but the invention is not limited thereto.

Then, in a step S230, the color gamut mapping circuit 106 performs a color gamut mapping operation on the second color channels C11, C21 and C31 to convert the second color channels C11, C21 and C31 into a plurality of third color channels C12, C22 and C32, and outputs the second image IM2 (for example, the standard definition image), where the second image IM2 includes a second pixel characterized by the third color channels C12, C22 and C32.

In the embodiment of the invention, the second color channels C11, C21 and C31 and the third color channels C12, C22 and C32 may correspond to different coordinate systems. To be specific, the operation executed in the step S220 may be roughly regarded as an operation to reduce the color gamut, and it is an irreversible operation. Namely, for those with ordinary skills in the art, the operation of enlarging the color gamut in turn is not feasible. Comparatively, the operation executed in the step S220 may be regarded as an operation of changing the representation of the coordinate system, which is a reversible operation. Namely, for those with ordinary skills in the art, it is feasible to change the coordinate system back to the original representation.

In the embodiment of the invention, the color gamut mapping circuit 106 may perform the aforementioned color gamut mapping operation based on the content of [R. Mantiuk, R. Mantiuk, A. Tomaszewska, and W. Heidrich, 'Color Correction for Tone Mapping' Computer Graphics Forum 2009, Vol. 28, Issue 2, April, 2009, pp. 193-20], and details thereof are not repeated. Moreover, in order to implement the technical content of the above literature, the color gamut mapping circuit 106 of the invention may include various hardware components required for implementing the above technique.

In an embodiment, the color gamut mapping circuit 106 may transmit the second image IM2 to the destination device 12 through a second image transmission interface. In different embodiments, the second image transmission interface is, for example, one of a USB Video Class (UVC) interface and a Peripheral Component Interconnect (PCI), but the invention is not limited thereto.

In an embodiment, when the second image transmission interface is the UVC interface, and the destination device 12 is a computer device, since the UVC interface only supports SDR without supporting HDR, if the computer device is required to have the ability to process HDR images, it is necessary to install a specially designed driver on the computer device in order to avoid problems related to compatibility.

However, through the image capturing device 100 between the image source device 11 and the destination device 12 that is provided by the invention, the high definition image may be directly converted into the standard definition image adapted to pass through the UVC interface in real time. In this case, the computer device may process the standard definition image while ensuring compatibility without installing the aforementioned driver, thus achieving a cross-platform technical effect.

Moreover, since the image capturing device 100 provided by the invention may convert the high definition image into the standard definition image, in addition to not using the computing resources of the destination device 12 (such as a computer device), the standard definition image may also be provided in real time with low latency. Therefore, compared to the conventional method, the image capturing device 100 of the invention is suitable for applications that require more real-time situations such as live broadcast, video conference, image analysis, etc.

It should be noted that although the first pixel in the first image IM1 is taken as an example for description in the above embodiments, the image capturing device 100 may substantially perform the previously instructed tone mapping operation, brightness adjustment operation, color gamut mapping operation, etc., on each pixel of the first image IM1. In this case, each of the pixels in the generated second image IM2 may have better color performance compared to the conventional method (especially the method of directly discarding some bits), so that the whole second image IM2 may have better color performance (for example, brighter, color fidelity, etc.).

In other embodiments, it is assumed that the tone mapping circuit 102, the color correction circuit 104, and the color gamut mapping circuit 106 are designed to only process color channels of a specific color space (such as RGB space), the image capturing device of the invention may be further provided with a corresponding conversion circuit to perform color space conversion/inverse conversion.

Figure 3:
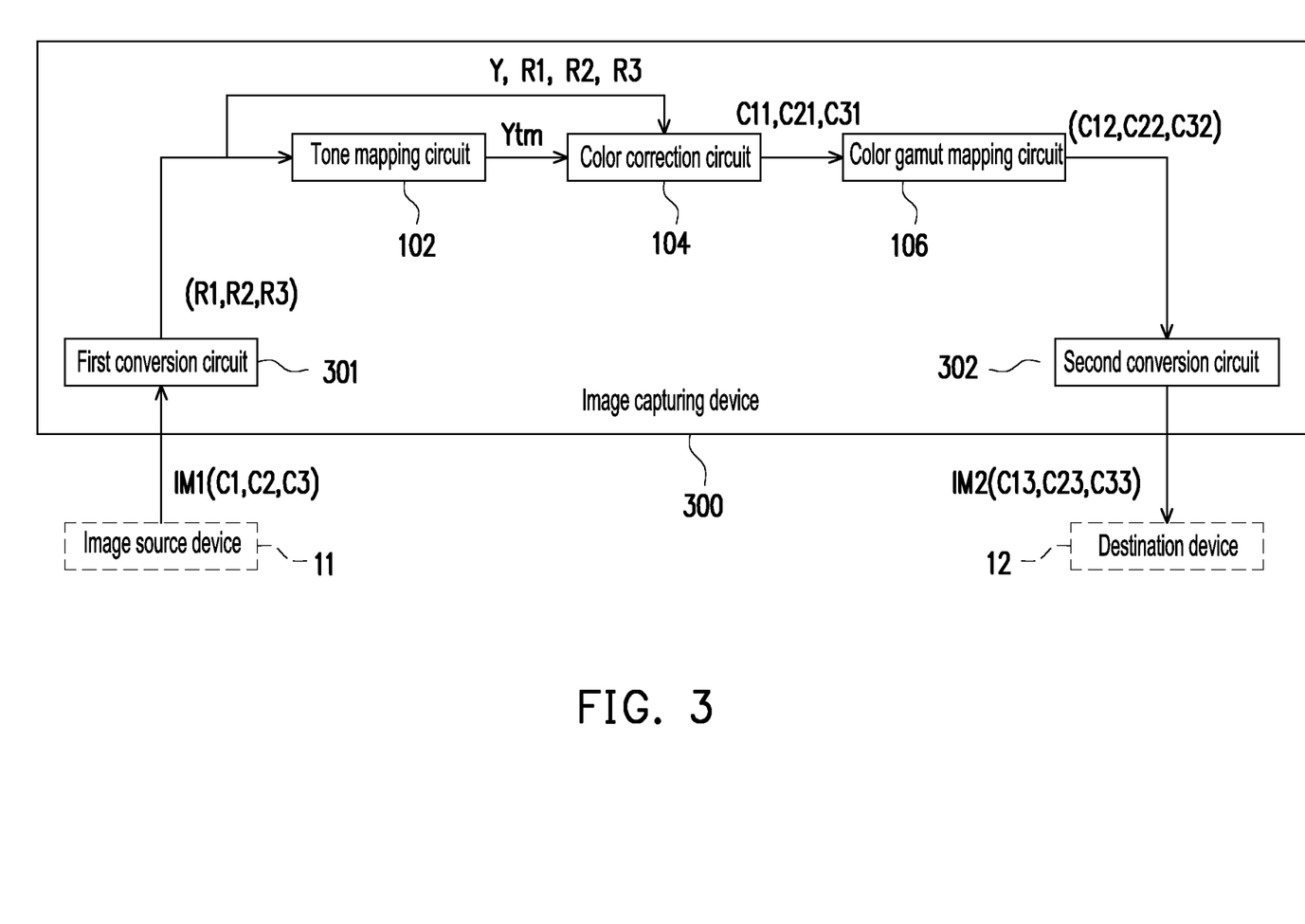
FIG. 3 is a schematic diagram of the image capturing device according to the embodiment of FIG. 1.

Referring to FIG. 3, FIG. 3 is a schematic diagram of the image capturing device according to the embodiment of FIG. 1. As shown in FIG. 3, the image capturing device 300 includes a first conversion circuit 301, the tone mapping circuit 102, the color correction circuit 104, the color gamut mapping circuit 106 and a second conversion circuit 302.

In the embodiment, the first conversion circuit 301 may obtain a first image IM1 including a first pixel, and converts a plurality of first color channels C1, C2, C3 of the first pixel into a plurality of reference color channels R1, R2, R3, where the first color channels C1, C2, C3 correspond to a first color space, and the reference color channels R1, R2, R3 correspond to a second color space. In the embodiment, the first color space may be a YUV space, and the second color space may be the RGB space. In other words, the first color channels C1, C2, C3 may respectively correspond to Y, U, V channels, and the reference color channels R1, R2, R3 may respectively correspond to R, G, B channels, but the invention is not limited thereto.

The tone mapping circuit 102 may be coupled to the first conversion circuit 301, and performs a tone mapping operation to obtain a brightness adjustment parameter Ytm based on a brightness Y of the first pixel. The color correction circuit 104 is coupled to the tone mapping circuit 102, and converts the reference color channels R1, R2, R3 into a plurality of second color channels C11, C21, C31 based on the brightness adjustment parameter Ytm and the brightness Y of the first pixel, where a color gamut corresponding to the second color channels C11, C21, C31 is narrower than a color gamut corresponding to the reference color channels R1, R2, R3. The color gamut mapping circuit 106 is coupled to the color correction circuit 104, and performs a color gamut mapping operation on the second color channels C11, C21, C31 to convert the second color channels into a plurality of third color channels C12, C22, C32. The second conversion circuit 302 is coupled to the color gamut mapping circuit 106, and converts the third color channels C12, C22, C32 into a plurality of fourth color channels C13, C23, C33 corresponding to the first color space (for example, the YUV space), and outputs a second image IM2, where the second image IM2 includes a second pixel characterized by the fourth color channels C13, C23, C33.

The operations of the tone mapping circuit 102, the color correction circuit 104 and the color gamut mapping circuit 106 may refer to the instructions of the previous embodiment, which are not repeated. Moreover, the color space conversion operations performed by the first conversion circuit 301 and the second conversion circuit 302 may be performed with reference to related conventional technical means, which are not repeated.

In some embodiments, the image capturing device of the invention may be further designed with a gamma correction circuit and a corresponding inverse gamma correction circuit, so as to perform gamma correction and inverse gamma correction on the considered color channels.

Figure 4:
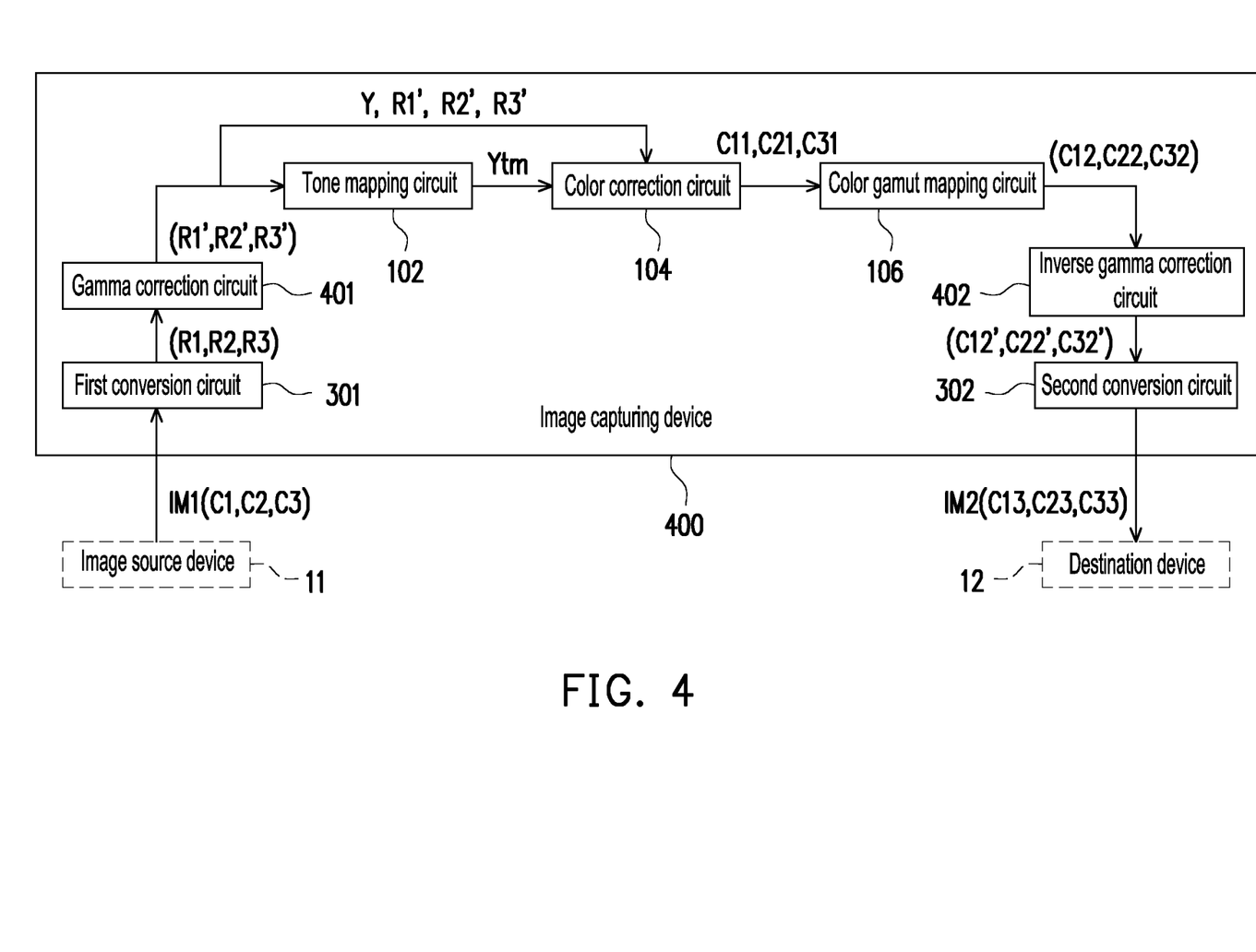
FIG. 4 is a schematic diagram of the image capturing device of FIG. 3.

Referring to FIG. 4, FIG. 4 is a schematic diagram of the image capturing device of FIG. 3. As shown in FIG. 4, the image capturing device 400 includes the first conversion circuit 301, a gamma correction circuit 401, the tone mapping circuit 102, the color correction circuit 104, the color gamut mapping circuit 106, an inverse gamma correction circuit 402 and the second conversion circuit 302.

In the embodiment, the first conversion circuit 301 may obtain a first image IM1 including a first pixel, and converts a plurality of first color channels C1, C2, C3 of the first pixel into a plurality of reference color channels R1, R2, R3, where the first color channels C1, C2, C3 correspond to a first color space (for example, the YUV space), and the reference color channels R1, R2, R3 correspond to a second color space (for example, the RGB space).

The gamma correction circuit 401 is coupled to the first conversion circuit 301, and executes a gamma correction on the reference color channels R1, R2, R3. For simplicity's sake, the reference color channels R1, R2, R3 which have been subjected to the gamma correction are represented as reference color channels R1', R2', R3'.

The tone mapping circuit 102 is coupled to the gamma correction circuit 401, and performs a tone mapping operation to obtain a brightness adjustment parameter Ytm based on a brightness Y of the first pixel. The color correction circuit 104 is coupled to the tone mapping circuit 102, and converts the corrected reference color channels R1', R2', R3' into a plurality of second color channels C11, C21, C31 based on the brightness adjustment parameter Ytm and the brightness Y of the first pixel, where a color gamut corresponding to the second color channels C11, C21, C31 is narrower than a color gamut corresponding to the reference color channels.

The color gamut mapping circuit 106 is coupled to the color correction circuit 104, and performs a color gamut mapping operation on the second color channels C11, C21, C31 to convert the second color channels C11, C21, C31 into a plurality of third color channels C12, C22, C32. The inverse gamma correction circuit 402 is coupled to the color gamut mapping circuit 106, and executes an inverse gamma correction on the third color channels C12, C22, C32. For simplicity's sake, the third color channels C12, C22, C32 which have been subjected to the inverse gamma correction may be represented as the third color channels C12', C22', C32'.

The second conversion circuit 302 is coupled to the inverse gamma correction circuit 402, and converts the inverse-corrected third color channels C12', C22', C32' into a plurality of fourth color channels C13, C23, C33 corresponding to the first color space (for example, the YUV space), and outputs a second image IM2, where the second image IM2 includes a second pixel characterized by the fourth color channels C13, C23, C33.

The operations of the tone mapping circuit 102, the color correction circuit 104, the color gamut mapping circuit 106, the first conversion circuit 301 and the second conversion circuit 302 may refer to the instructions of the previous embodiment, which are not repeated. Moreover, the gamma correction operation and the inverse gamma correction operation performed by the gamma correction circuit 401 and the inverse gamma correction circuit 402 may be performed with reference to related conventional technical means, which are not repeated.

In summary, after obtaining the high definition image from the image source device, the image capturing device of the invention sequentially performs the tone mapping operation, brightness adjustment operation and color gamut mapping operation, etc., on the high definition image through the corresponding hardware circuit, so as to convert the high definition image into the standard definition image with better color performance, and provides it to the destination device (for example, a computer device). In this way, compared to the conventional method of performing the above-mentioned conversion by the destination device in a software manner, and the method of directly discarding some bit values of the color channels (without any conversion), the invention may provide the standard definition image with better color performance in real-time without consuming the resources of the destination device, which is suitable for occasions that require more real-time performance such as live broadcast, video conference, etc.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:
1. An image capturing device, comprising:
a tone mapping circuit, obtaining a first image comprising a first pixel, and performing a tone mapping operation to obtain a brightness adjustment parameter based on a brightness of the first pixel, wherein the first pixel comprises a plurality of first color channels;
a color correction circuit, coupled to the tone mapping circuit, and converting the first color channels into a plurality of second color channels based on the brightness adjustment parameter and the brightness of the first pixel, wherein a color gamut corresponding to the second color channels is narrower than a color gamut corresponding to the first color channels; and
a color gamut mapping circuit, coupled to the color correction circuit, and performing a color gamut mapping operation on the second color channels to convert the second color channels into a plurality of third color channels, and outputting a second image, wherein the second image comprises a second pixel characterized by the third color channels.
2. The image capturing device as claimed in claim 1, wherein the first image is transmitted to the image capturing device through a first image transmission interface, and the color gamut mapping circuit outputs the second image through a second image transmission interface.

3. The image capturing device as claimed in claim 2, wherein the first image transmission interface comprises one of a High Definition Multimedia Interface, a Mobile Industry Processor Interface and a Low Voltage Differential Signaling transmission interface.

4. The image capturing device as claimed in claim 2, wherein the second image transmission interface comprises one of a USB Video Class interface and a Peripheral Component Interconnect standard.

5. The image capturing device as claimed in claim 1, wherein the first image corresponds to a high dynamic range, and the second image corresponds to a standard dynamic range.

6. The image capturing device as claimed in claim 1, wherein the first image corresponds to a wide color gamut, and the second image corresponds to a standard color gamut.

7. The image capturing device as claimed in claim 1, wherein the image capturing device obtains the first image from an image source device, and provides the second image to a destination device.

8. The image capturing device as claimed in claim 7, wherein the destination device comprises one of a computer device and a video conference system.

9. The image capturing device as claimed in claim 1, wherein the color gamut corresponding to the second color channels is a standard color gamut, and the color gamut corresponding to the first color channels is a wide color gamut.

10. The image capturing device as claimed in claim 1, wherein the second color channels and the third color channels correspond to different coordinate systems.

11. An image capturing device, comprising:
a first conversion circuit, obtaining a first image comprising a first pixel, and converting a plurality of first color channels of the first pixel into a plurality of reference color channels, wherein the first color channels correspond to a first color space, and the reference color channels correspond to a second color space;
a tone mapping circuit, coupled to the first conversion circuit, and performing a tone mapping operation to obtain a brightness adjustment parameter based on a brightness of the first pixel;
a color correction circuit, coupled to the tone mapping circuit, and converting the reference color channels into a plurality of second color channels based on the brightness adjustment parameter and the brightness of the first pixel, wherein a color gamut corresponding to the second color channels is narrower than a color gamut corresponding to the reference color channels;
a color gamut mapping circuit, coupled to the color correction circuit, and performing a color gamut mapping operation on the second color channels to convert the second color channels into a plurality of third color channels; and
a second conversion circuit, coupled to the color gamut mapping circuit, and converting the third color channels into a plurality of fourth color channels corresponding to the first color space, and outputting a second image, wherein the second image comprises a second pixel characterized by the fourth color channels.

12. An image capturing device, comprising:
a first conversion circuit, obtaining a first image comprising a first pixel, and converting a plurality of first color channels of the first pixel into a plurality of reference color channels, wherein the first color channels correspond to a first color space, and the reference color channels correspond to a second color space;
a gamma correction circuit, coupled to the first conversion circuit, and executing a gamma correction on the reference color channels;
a tone mapping circuit, coupled to the gamma correction circuit, and performing a tone mapping operation to obtain a brightness adjustment parameter based on a brightness of the first pixel;
a color correction circuit, coupled to the tone mapping circuit, and converting the corrected reference color channels into a plurality of second color channels based on the brightness adjustment parameter and the brightness of the first pixel, wherein a color gamut corresponding to the second color channels is narrower than a color gamut corresponding to the reference color channels;
a color gamut mapping circuit, coupled to the color correction circuit, and performing a color gamut mapping operation on the second color channels to convert the second color channels into a plurality of third color channels;
an inverse gamma correction circuit, coupled to the color gamut mapping circuit, and executing an inverse gamma correction on the third color channels; and
a second conversion circuit, coupled to the inverse gamma correction circuit, and converting the inverse-corrected third color channels into a plurality of fourth color channels corresponding to the first color space, and outputting a second image, wherein the second image comprises a second pixel characterized by the fourth color channels.

13. An image capturing method, comprising:
obtaining a first image comprising a first pixel, and performing a tone mapping operation to obtain a brightness adjustment parameter based on a brightness of the first pixel, wherein the first pixel comprises a plurality of first color channels;
converting the first color channels into a plurality of second color channels based on the brightness adjustment parameter and the brightness of the first pixel, wherein a color gamut corresponding to the second color channels is narrower than a color gamut corresponding to the first color channels; and
performing a color gamut mapping operation on the second color channels to convert the second color channels into a plurality of third color channels, and outputting a second image, wherein the second image comprises a second pixel characterized by the third color channels.

* * * * *